US008306750B2

(12) United States Patent
Griffin

(10) Patent No.: US 8,306,750 B2
(45) Date of Patent: Nov. 6, 2012

(54) COMPUTER-AUTOMATED SPATIAL ANALYSIS

(75) Inventor: Terry Griffin, Bryant, AR (US)

(73) Assignee: Plant Health Care, Inc., Pittsburgh, PA (US)

( * ) Notice: Subject to any disclaimer, the term of this patent is extended or adjusted under 35 U.S.C. 154(b) by 285 days.

(21) Appl. No.: 12/719,154

(22) Filed: Mar. 8, 2010

(65) Prior Publication Data

US 2011/0166788 A1 Jul. 7, 2011

Related U.S. Application Data

(60) Provisional application No. 61/234,791, filed on Aug. 18, 2009.

(51) Int. Cl.
*G01V 3/00* (2006.01)
(52) U.S. Cl. .......................................................... 702/2
(58) Field of Classification Search ..................... 702/2
See application file for complete search history.

(56) References Cited

U.S. PATENT DOCUMENTS

| | | | |
|---|---|---|---|
| 5,771,169 A | 6/1998 | Wendte | |
| 5,878,371 A | 3/1999 | Hale et al. | |
| 5,991,687 A | 11/1999 | Hale et al. | |
| 5,995,894 A | 11/1999 | Wendte | |
| 6,002,984 A | 12/1999 | Aughenbaugh | |
| 6,058,351 A | 5/2000 | McCauley | |
| 6,192,664 B1 | 2/2001 | Missotten et al. | |
| 6,505,146 B1 * | 1/2003 | Blackmer ..................... 702/189 |
| 6,522,948 B1 | 2/2003 | Benneweis | |
| 6,601,341 B2 | 8/2003 | Raun et al. | |
| 6,662,185 B1 | 12/2003 | Stark et al. | |
| 6,865,582 B2 | 3/2005 | Obradovic et al. | |
| 6,990,459 B2 | 1/2006 | Schneider | |
| 7,047,133 B1 | 5/2006 | Dyer et al. | |
| 7,050,910 B2 | 5/2006 | Kleemola et al. | |
| 7,711,531 B2 * | 5/2010 | Kapadi et al. .................. 703/6 |
| 2002/0023052 A1 | 2/2002 | Remley et al. | |
| 2002/0099471 A1 | 7/2002 | Benneweis | |
| 2003/0208319 A1 | 11/2003 | Ell et al. | |
| 2005/0125260 A1 | 6/2005 | Green et al. | |
| 2005/0234691 A1 | 10/2005 | Singh et al. | |
| 2006/0015253 A1 | 1/2006 | Ochs et al. | |
| 2008/0304711 A1 * | 12/2008 | Scharf et al. ................ 382/110 |

FOREIGN PATENT DOCUMENTS

| | | |
|---|---|---|
| JP | 2005151851 A | 6/2005 |
| WO | 2009048341 A1 | 4/2009 |

OTHER PUBLICATIONS

"Yield Editor Manual", 1.02 Beta Version, Mapshots, Inc., 2000-2010, 16 pages.
Erickson, Bruce , "Workshop Helps Farmers Utilize One of Their Key Resources: Information", Site Specific Management Center Newsletter, Nov. 2005 , 3 pages.

(Continued)

*Primary Examiner* — Aditya Bhat
(74) *Attorney, Agent, or Firm* — Robert Plotkin, P.C.

(57) ABSTRACT

Some embodiments of the present invention automatically measure the impact of natural conditions and/or deliberate interventions on crop yields. Other embodiments automatically predict the impact of natural conditions and/or deliberate interventions on crop yields. By eliminating the need for human intervention, judgment, or discretion from the processes of measuring and predicting impact on yield, embodiments of the present invention enable such measurements and predictions to be made significantly more accurately, quickly, and inexpensively than has been possible with preexisting techniques.

40 Claims, 4 Drawing Sheets

OTHER PUBLICATIONS

Griffin, Terry W., "Decision-Making From On-Farm Experiments: Spatial Analysis of Precision Agriculture Data", A Dissertation Submitted to the Faculty of Purdue University, Dec. 2006, 294 pages.

Griffin, Terry, "Farmers' Use of Yield Monitors", Agriculture and Natural Resources, University of Arkansas United States Department of Agriculture, and County Governments Cooperating, Updated on Apr. 30, 2010. 4 pages. Available at: http://www.uaex.edu.

Griffin, Terry W. et al., "Yeikd Monitor Data Analysis Protocol: A Primer in the Management and Analysis of Precision Agriculture Data", Department of Agricultural Economics and Agribusiness, Cooperative Extension Service, Version 2, Jun. 2007, 43 pages.

Hurley, Terrence M. et al., "The Value of Information for Variable Rate Nitrogen Applications: A Comparison of Soil Test, Topographical, and Remote Sensing Information", American Agricultural Economics Association Annual Meeting, Aug. 5-Aug. 8, 2001, 21 pages.

Lawton, Kurt, "Use Smarter Numbers", Precision Agriculture Spatial Analysis Article, Feb. 2009, pp. 34-35.

Rice, Rick, "2008 MidState Ag Aviation Conference", Airstrike, Satellite Weigh Wagon, Nov. 6, 2008, 10 pages.

* cited by examiner

COMPUTER-AUTOMATED SPATIAL ANALYSIS

CROSS-REFERENCE TO RELATED APPLICATIONS

This application claims priority under 35 U.S.C. §119(e) from co-pending and commonly-owned U.S. Prov. Pat. App. Ser. No. 61/234,791, filed on Aug. 18, 2009, entitled, "Method of Marketing and Contracting for the Sale of Agricultural Yield-Increase Related Products," which is hereby incorporated by reference herein. This application is related to the following commonly-owned patent applications, both of which are incorporated by reference herein:

U.S. Prov. Pat. App. Ser. No. 61/109,359, filed on Oct. 29, 2008, entitled, "Method of Marketing and Contracting for the Sale of Agricultural Yield-Increase Related Products"; and U.S. Pat. App. Ser. No. 12/608,659, filed on Oct. 29, 2009, entitled, "Method of Marketing and Contracting for the Sale of Agricultural Yield-Increase Related Products."

BACKGROUND

Agriculturalists have long understood that varying the products (such as fertilizers, pesticides, and other agricultural inputs) applied at different locations within a field, and that varying the rates at which such products are applied at different locations within a field, can affect crop yield. More generally, the term "system" is used within agriculture to refer to a collection of one or more products, practices, and application rates. It has long been known that varying the system from one location to another within a field can affect crop yield. Traditional agriculture, however, has lacked the tools to determine with high accuracy which product, rate, or system should be applied at different locations within a field to optimize the yield within those locations.

In response to this problem, agriculturalists have begun to develop techniques for "precision agriculture," which aims to use computers and other information technology—such as global positioning systems (GPS) and geographic information systems (GIS)—to facilitate the application of appropriate rates of agricultural inputs at specific locations. Precision agriculture technologies have spread rapidly in the Midwestern United States, with yield monitoring equipment being used by farmers to monitor the yield of 36% of corn and 29% of soybean area harvested in 2001 and 2002. In 2009, 57% of service providers used yield monitors (31% without GPS and 26% with GPS). Precision agriculture has already begun to produce results which demonstrably increase profitability.

Better understanding of system effects within fields utilizing precision agriculture can be achieved via the use of spatial analysis, which is the process of accounting for the impact of natural variability, deliberate interventions (such as application of pesticides and/or fertilizers), and/or man-made or man-caused phenomena (such as cropping history) on yield in commercial agriculture crop production fields. The science of agriculture spatial analysis is relatively new, and heretofore, it has required a significant amount of human intervention at each decision node, such as entering and accounting for field variables, interpreting diagnostics at intermediate steps, and accounting for the attendant geo-referenced crop yield.

Spatial analysis in particular utilizes geo-referenced, or precision agriculture yield monitor technology. One of the leading barriers to farmers adopting yield monitor technology is the lack of complementary services in data analysis. Without data analysis services, farmers have little incentive to adopt yield-monitor technology. One of the leading uses of yield monitor technology (which represents the third-highest use for corn and soybean farmers and the highest use for cotton farmers) is to conduct on-farm experiments. Several decision nodes exist in the process of properly analyzing on-farm experiment data, such as collecting data and interpreting the quantitative results.

Even with sufficient equipment and machinery to implement on-farm experiments and collect site-specific yield and supporting information, the lack of qualified analysts able to provide services for a fee that farmers are willing to pay exists. The few individuals schooled in the art of crop yield spatial analysis charge a fee of approximately $500/field to conduct such an analysis. As a result, very few farmers avail themselves of the enhanced information that spatial analysis can provide.

What is needed, therefore, are improved techniques for performing spatial analysis quickly and inexpensively.

SUMMARY

Some embodiments of the present invention automatically measure the impact of natural conditions and/or deliberate interventions on crop yields. Other interventions automatically predict the impact of natural conditions and/or deliberate interventions on crop yields. By eliminating the need for human intervention, judgment, or discretion from the processes of measuring and predicting impact on yield, embodiments of the present invention enable such measurements and predictions to be made significantly more accurately, quickly, and inexpensively than has been possible with preexisting techniques.

For example, one embodiment of the present invention is directed to a computer-implemented method comprising: (A) identifying spatial yield data descriptive of crop yields associated with a plurality of spatial locations in a field; (B) identifying at least one of the following data: (B) (1) experimental design data descriptive of at least one product, system, or rate associated with the plurality of locations in the field; (B) (2) natural condition data descriptive of natural conditions of the plurality of locations in the field; (B) (3) noise data descriptive of noise variables associated with the plurality of locations in the field; and (C) deriving, from the data identified in (B), a measure of the crop yield response in the field to the data identified in (B).

Other features and advantages of various aspects and embodiments of the present invention will become apparent from the following description and from the claims.

DETAILED DESCRIPTION

Figure 1:
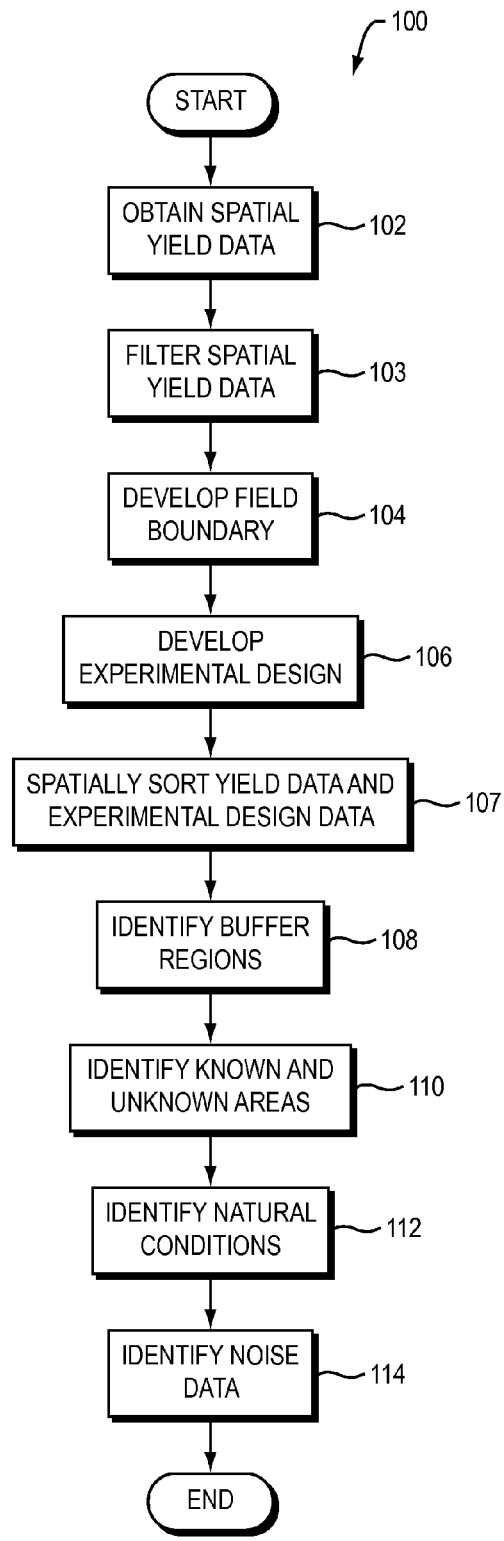
FIG. 1 is a flow chart of a method for obtaining agricultural data according to one embodiment of the present invention.

Embodiments of the present invention include systems and methods for automatically measuring the impact of deliberate interventions on crop yield. Such deliberate interventions may include, for example, the application of particular products, rates, or systems to areas within fields. For example, embodiments of the present invention may be used to automatically measure the impact of a particular product on each of one or more areas within a field, the impact of multiple products on multiple areas (e.g., the impact of a first product on a first area relative to the impact of a second product on a second area), the impact of different rates of the same product on different areas, or the impact of a system (a particular series or sequence of agronomic treatments or inputs applied at a particular rate or rates) on a particular area. These are merely examples of measurements which may be made automatically using embodiments of the present invention.

Embodiments of the present invention may also be used to measure the impact of natural variations among different areas on crop yield. For example, embodiments of the present invention may be used to measure the impact of natural conditions in a first area on yield in the first area, relative to the impact of natural conditions in a second area on yield in the second area. The techniques disclosed herein for measuring the impact of deliberate interventions on crop yield may be combined with the techniques disclosed herein for measuring the impact of natural variability on crop yield, to automatically measure the combined impact of both deliberate interventions and natural variability on crop yield.

Embodiments of the present invention may also be used to make predictions about the impact of deliberate interventions and/or natural conditions on crop yield in one or more areas before crop yield measurements have been taken in those areas, and even before crops have been grown in those areas. Such predictions may be made, for example, based on historical data, which may include historical data about any one or more of the following: deliberate interventions applied, natural conditions, and crop yield. Such historical data may or may not include historical data for the area about which a prediction is made. For example, historical data may be collected about the natural (e.g., soil) conditions, deliberate interventions applied, and yield of a first area. Based on such data, embodiments of the present invention may make a prediction about the crop yield to be obtained in the first area in the future, or in a second area. Such a prediction may be based, for example, on data about the natural conditions of the second area and/or the deliberate interventions intended to be (or which have been) applied to the second area. The prediction may or may not be further based on historical data about the second area.

A primary benefit of embodiments of the present invention is that they automate the process of measuring and predicting the impact of natural conditions and/or deliberate interventions on yield, thereby enabling such measurements and predictions to be made without human intervention, judgment, or discretion. As a result, such measurements and predictions may be made much more accurately, quickly, and inexpensively than has been possible with preexisting techniques. Additional details and advantages of various embodiments of the present invention will be described below.

A particular embodiment of the present invention will now be described. This embodiment is merely an example and does not constitute a limitation of the present invention. This embodiment may, for example, be implemented in software executing on a computer. For example, this embodiment may be implemented as one or more scripts designed for use in conjunction with the "R Project for Statistical Computing" software library. Those having ordinary skill in the art, however, will appreciate how to implement the techniques disclosed herein in other ways.

Figure 2:
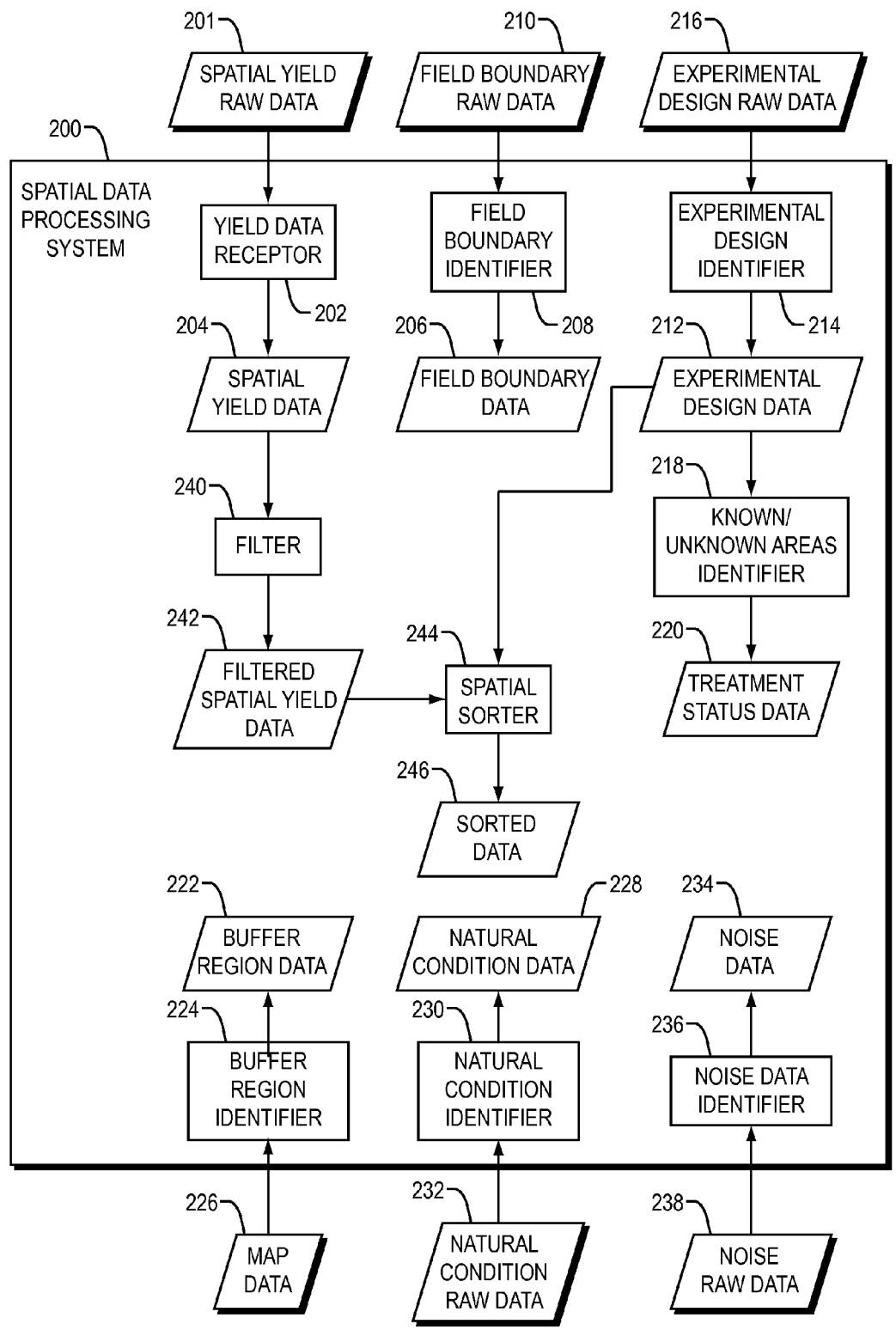
FIG. 2 is a dataflow diagram of a system for performing the method of FIG. 1 according to one embodiment of the present invention.

Referring to FIG. 1, a flow chart is shown of a method 100 that is performed by an automated spatial analysis system 200, shown in FIG. 2, according to one embodiment of the present invention to obtain various kinds of agricultural data. First, spatial yield data 201 are obtained by a yield data receptor 202 (FIG. 1, operation 102). Such data may, for example, be obtained by detecting and uploading raw spatial yield data 201 from a farmer's yield monitor card or other yield monitoring equipment. The resulting spatial yield data 204 used within the automated spatial analysis system 200 may be the same as the raw data 201, or be processed for use within the system 200.

The spatial yield data 204 may include any number of elements, each of which may correspond to a particular geographic location within a particular field, which is referred to herein as the "measured field." Each element may include, for example, data representative of a geographic location and the harvest rate associated with that geographic location. The geographic location may, for example, be represented in latitude and longitude, such as may be obtained using a GPS device. The harvest rate may be measured in any units, such as kilograms/second. Examples of other spatial yield data variables that may be collected and analyzed using embodiments of the present invention include, but are not limited to: GPS time (representing the time at which a GPS reading was taken), logging interval(s), distance (represented, for example, in inches), swath (represented, for example, in inches), moisture (measured, for example, in percent), header status (up, down, or otherwise engaged), pass number (sequential or unique number of transects or swaths through the field), serial number, field ID (identifier for the field, can be numeric or alpha-numeric), load ID (machine or operator chosen identifier for load or basket), grain type (corn, soybean, rice, or even cotton for cotton picker yield monitor), GPS status (indicator of GPS quality such as whether differential GPS (DGPS) is active or otherwise a metric for reliability of the signal), and altitude (measured, for example, in feet). By collecting multiple elements of spatial yield data, information about multiple geographic locations is obtained.

A filter 240 filters the spatial yield data 204 by, for example, removing erroneous observations and performing spatial location adjustments within the spatial yield data 204, such as setting flow delay (which does not remove any observations, but instead adjusts the locations of observations to relocate them to their correct locations) (FIG. 1, operation 103). The result is a set of filtered spatial yield data 242.

Any of a variety of techniques may be used to filter the spatial yield data 204. For example, it is understood that with currently available yield monitor technology, data collected by a harvester traveling at more than 7 mph is not reliable. Therefore, data collected by a harvester traveling at more than 7 mph may be assumed to be erroneous and discarded. As another example, certain yield values are inherently implausible and may be assumed to be erroneous and discarded. Erroneous data may be filtered, for example, using software such as Yield Editor, developed by Kenneth A. Sudduth and Scott T. Drummond at the USDA-ARS, Cropping Systems and Water Quality Research Unit at the University of Missouri.

Next, a field boundary for the field and experiment are developed by a field boundary identifier 208, which outputs field boundary data 206 representing the field boundary (FIG. 1, operation 104). The field boundary identifier 208 may, for example, develop the field boundary 206 based on raw field boundary data 210. The raw field boundary data 210 may, for example, be developed by a person and/or automated system which physically measures the boundary of the measured field and provides the raw data 210 as an input to the field boundary identifier 208. As another example, the field boundary identifier 208 may obtain (e.g., by downloading over the Internet or other network) the field boundary raw data 210 automatically in electronic form from the USDA or real estate tract data. As yet another example, the field boundary raw data 210 may be or include a digital aerial image of the corresponding field, in which case the field boundary identifier 208 may automatically recognize the boundary of the measured field using boundary recognition software, to thereby generate the field boundary data 206.

The field boundary data 206 may represent the field boundary in any way, such as by using a set of coordinates defining the boundary. The boundary may be measured to enclose a single crop so that the impact on yield of that crop may be measured and/or predicted. A single boundary may, however, include multiple disjoint (non-contiguous) closed curves (islands), in which case the union of the areas inside all of the curves within the boundary is considered to be the area defined by the field boundary data 206. Such islands may be separated from each other by any distance and may span fields on multiple farms. Therefore, although the term "field" may be used in the art to refer to a field on a particular farm, the use of terms such as "field," "field boundary," and "area" have no such limitation as used herein in connection with embodiments of the present invention.

Next, an experimental design 212 is created or imported from an external source 216 by an experimental design identifier 214 (FIG. 1, operation 106). The experimental design data 212 specifies, for each of one or more areas within the measured field, which product(s), rate(s), and/or system(s) (if any) will be applied to the area. The experimental design data 212 may affirmatively specify which areas within the measured field are to remain untreated, or may simply omit information about such areas.

Precision agriculture data are collected such that a single observation in one data layer may not exactly align with other observations in other data layers. The different data layers must have a common location attribute to be analyzed with statistical methods. Therefore, a spatial sorting module 244 may spatially sort data, such as the filtered spatial yield data 242 and the experimental design data 212, to produce sorted data 246 (FIG. 1, operation 107). Spatial sorting involves spatially aligning different data layers so that data from different layers, but which relate to the same geographic coordinates, may be correlated with each other. Although not shown in FIGS. 1 and 2, the system 200 may further clip the sorted data 246 so that any data which relate to geographic coordinates falling outside the field boundary 206 are removed from the filtered spatial yield data 242, or otherwise flagged to be ignored in the subsequent processing described below.

The system 200 may create buffer regions 222 around treated, untreated, and unknown areas (FIG. 1, operation 108). For example, if a region in the measured field is adjacent to a road or the woods, it is desirable not to include such a region within the set of data to be analyzed. Therefore, such a region may be designated as a buffer region and thereby be removed from the area within which it was originally contained or otherwise be labeled as "unknown." A buffer region identifier 224, which generates the buffer region data 222, may identify the buffer region(s) in any of a variety of ways, such as by retrieving existing map data 226 which specifies locations of roads, woods, and other geographic features which are relevant to the creation of buffer regions 222.

One or more areas within the measured field may be labeled as "unknown" (or "indeterminate") (FIG. 1, operation 110). In the embodiment shown in FIG. 2, a known/unknown areas identifier 218 uses the experimental design data 212 to generate data 220 indicating the treatment status (e.g., "treated," "untreated," or "unknown") of each of one or more areas within the measured field. For example, consider a case in which a product is to be applied (or has been applied) to the measured field by an airplane. In this case, it is not known whether a portion of the measured field near the boundary between a treated and untreated area has itself been treated. Therefore, the known/unknown areas identifier 218 may label such a boundary area as "unknown" within the treatment status data 220.

Although the treatment status data 220 is shown as being separate from the experimental design data 212 in FIG. 1, this is merely an example and is not a requirement of the present invention. Alternatively, for example, the known/unknown area identifier 218 may achieve the same result by modifying the experimental design data 212 to indicate the treatment status of one or more areas. Furthermore, although in the example shown in FIG. 2, the treatment status data 220 is derived from the experimental design data, this is merely an example and is not a requirement of the present invention. The treatment status data 220 may be derived from data in addition to and/or instead of the experimental design data 212.

The system 200 may obtain data 228 descriptive of natural (e.g., soil) conditions within the measured field (FIG. 1, operation 112). Such data 228 may include data which vary from one region in the measured field to the next. Such information may, for example, be of the kind which may be obtained from the Natural Resources Conservation Service (NRCS) of the U.S. Department of Agriculture (USDA). Alternatively, for example, such data 228 may be obtained from the farmer or other owner of the field, and which may therefore not be publicly available. In the example shown in FIG. 2, a module 230 within the system 200 reads raw natural condition data 232 from an external source to produce natural condition data 228 for use by the system 200. The resulting data 228 used within the system 200 may be the same as the raw data 232, or be processed for use within the system 200.

However the natural conditions data 228 is obtained, such data 228 may measure within-field variability. Both publicly available and privately obtained data may be combined together in various ways to generate a combined data set for use as the natural conditions data 228.

Yet another set of data which may be obtained is noise data 234. "Noise variables" are defined herein as variables for which variations in value are unexplained. Therefore, the noise data 234 contains values of noise variables, which include, for example, variables such as drainage, terrain (e.g., elevation and derivatives of elevation, such as slope and aspect), and electrical conductivity (e.g., resistance of electrical flow) (FIG. 1, operation 114). Such data 234 may be obtained from any combination of public and/or private sources. In the example shown in FIG. 2, a module 236 within the system 200 reads raw noise data 238 from an external source to produce noise data 234 for use by the system 200. The resulting data 234 used within the system 200 may be the same as the raw data 238, or be processed for use within the system 200.

Once the various data described above have been obtained, they may be processed in a variety of ways. For example, referring to FIG. 3, a flowchart is shown of a method 300 performed by a system 400 of FIG. 4 to automatically perform spatial analysis on agricultural data, and thereby to draw conclusions about the impact of deliberate interventions, natural conditions, and/or noise data on crop yield.

For ease of explanation, the term "combined data layers" is used in FIGS. 3 and 4 and in the description below to refer collectively to the various data sets obtained in FIGS. 1 and 2. The combined data layers 402 in FIG. 4 may, for example, include one or more of the spatial yield data 204 (as sorted within the sorted data 246), field boundary data 206, experimental design data 212 (as sorted within the sorted data 246), buffer region data 222, treatment status data 220, natural conditions data 228, and noise data 234 from FIG. 2. The combined data layers 402 may also include additional data useful for performing the functions disclosed below. Processing which is described herein as being performed on the combined data layers 402 may be performed on some or all of the combined data layers 402.

Figure 3:
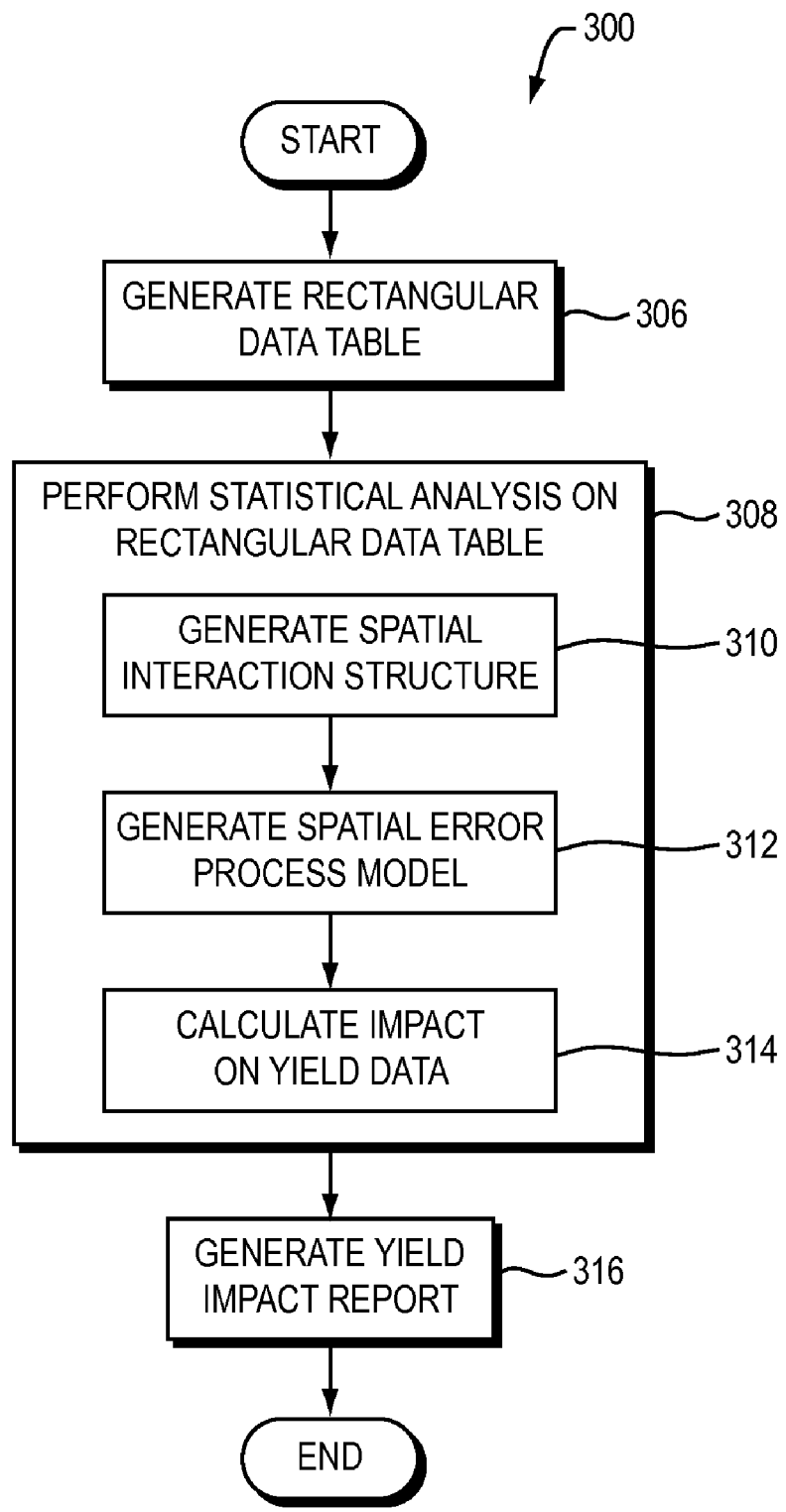
FIG. 3 is a flow chart of a method for performing automated spatial analysis on agricultural data according to one embodiment of the present invention.
Figure 4:
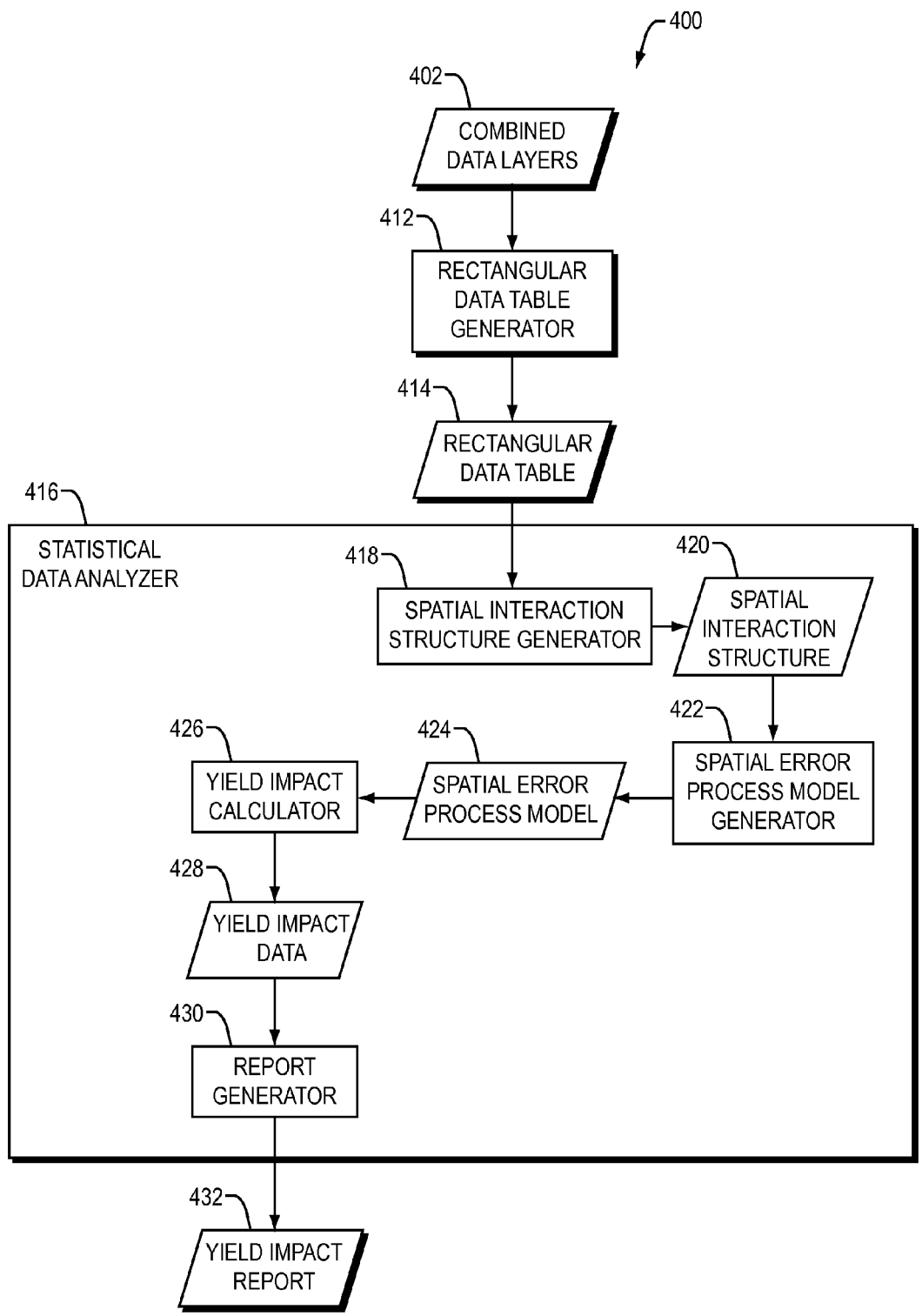
FIG. 4 is a dataflow diagram of a system for performing the method of FIG. 3 according to one embodiment of the present invention.

A rectangular data table generator 414 generates a rectangular data table 414 based on the combined data layers 402 (FIG. 3, operation 306). All of the data layers from the combined data layers 402 (including both continuous and discrete data) are assembled into a rectangular array within the rectangular data table 414. Each row of the rectangular data table 414 contains the data from all of the data layers in the combined data layers 402 for a single observation at a particular geographic location (e.g., latitude and longitude). It is possible for the system 400 to create the rectangular data table 414 because the data 402 were previously aligned spatially, as described above with respect to operation 107 of FIG. 1 and element 244 of FIG. 2.

Next, a statistical data analyzer 416 performs statistical data analysis on the data stored in the rectangular data table 414 (FIG. 3, operation 308). For example, any spatial effects in the data in the rectangular data table 414 may be identified using a technique such as Moran's I (a measure of spatial autocorrelation). Note, however, that identification of spatial effects, and the use of Moran's I, are optional.

If any spatial effects are detected (or if the step of testing for spatial effects is omitted), then the data in the rectangular data array 414 are analyzed using an appropriate spatial statistical method that explicitly models the spatial structure of the particular data. Any of a variety of such spatial statistical methods may be used. One such method is the spatial error process model, which is based upon theory and a priori information about similar types of data.

In order to analyze a spatial data set, a spatial interaction structure (also referred to herein as a "neighborhood structure") must be specified to explicitly model the spatial structure of the data. The spatial interaction structure specifies the distance (referred to as the "spatial range") within which two data points are considered to be neighbors. In other words, if and only if two data points (represented by two rows in the rectangular data array) are separated from each other by less than the corresponding spatial range, those two data points will be considered to be neighbors.

Since each dataset has a potentially unique spatial data structure, the spatial interaction structure may be empirically determined for the particular dataset stored in the rectangular data array. As shown in the embodiment of FIG. 4, a spatial interaction structure generator 418 uses generates a spatial interaction structure 420 based on the rectangular data table 414 (FIG. 3, operation 310).

Examples of techniques which may be used to empirically determine the spatial interaction structure 420 include spatial diagnostics, such as spatial correlograms, Lagrange Multiplier tests of the linear model residuals, or semivariograms. For example, a linear (non-spatial) model may be specified such that the dependent variable, yield, is regressed upon treated area, untreated area, each zone of homogeneity in the field (e.g., soil series or mapping unit), and interaction terms between treatments and zones, among others. The residuals from the non-spatial linear model may be collected, and the residuals may be analyzed to determine which level of connectedness (e.g., cutoff distance) maximizes the chi-squared values, such as by performing Lagrange Multiplier tests on the residuals. At the empirically determined level of connectedness, the spatial interaction structure may be specified for the particular data.

A spatial model may then be created, using any of a variety of techniques, such as the spatial autoregressive error (error), the spatial autoregressive lag (lag) model, or the geostatistical model. The spatial error model is given as $y = X\beta + \epsilon$, $\epsilon = \lambda W \epsilon + \mu$ where y is a n×1 vector of dependent variables, X a n×k matrix of explanatory variables, $\beta$ a k×1 vector of regression coefficients, $\epsilon$ an n×1 vector of residuals, $\lambda$ a spatial autoregressive parameter, W is an n×n spatial weights matrix defining the spatial neighborhood structure, and $\mu$ a well behaved, non-heteroskedastic uncorrelated error term. The spatial lag model is given as $y = \rho W y + X\beta + \mu$ where $\rho$ is the spatial autoregressive parameter and the others as previously defined. The geostatistical model is a data-driven approach that relies upon pair wise observations to explicitly model the distance decay functional form specified with the semivariogram.

Whichever spatial model is used, a spatial error process model generator 422 then specifies the model as a spatial error process model using the spatial interaction structure 420. Coefficients of the spatial error process model 424 are estimated to complete the generation of the spatial error process model 424 (FIG. 3, operation 312).

A yield impact calculator 426 uses the resulting spatial error process model 424 (with its estimated coefficients) to calculate the impact 428 of one or more measured variables (such as deliberate interventions, natural conditions, and/or noise data) on each of one or more areas within the measured field (FIG. 3, operation 314). In general, the yield impact data 428 represents a measure of the crop yield response in the field to the data in the combined data layers 402.

The resulting yield impact data 428 may be presented in table form and used by a report generator 430 to generate a report 432 (FIG. 3, operation 316). The report 432 may include a variety of information, such as a measurement or prediction of:

the impact of X on yield in a particular area;
the impact of X on yield in a particular area relative to the impact of Y on yield in the same area; and
the impact of X on yield in a particular area relative to the impact of X on yield in a different area.

In the examples just listed, X may be any combination of zero or more: (1) deliberate interventions (products, rates, or systems); (2) natural conditions (e.g., soil conditions); and (3) noise data. The terms X and Y are used to indicate data which differ from each other (e.g., two different products or two different soil conditions).

For example, the generated report 432 may indicate the relative of impact on yield of two systems in a particular area, or of two rates of application of the same product in two different areas. These and other examples may be combined with each other in any way using the techniques disclosed herein.

Measuring or predicting the impact of a deliberate intervention (i.e., product, rate, or system) may include measuring or predicting the impact of a lack of intervention. For example, the impact applying a first product to a particular area may be measured relative to the impact of applying no product to the same area.

In addition, embodiments of the present invention may be used to measure the yield impact not only of deliberate interventions, but also of natural conditions, such as soil conditions, and of noise data (such as drainage). For example, the impact of natural conditions on yield in a first area may be measured or predicted relative to the impact of natural conditions on yield in a second area.

The report 432 may include any number of such conclusions (i.e., measurements and/or predictions). For example, it may include a single conclusion for the entire measured field, which may represent an average of multiple conclusions drawn across the field. As another example, the report 432 may include a separate conclusion for each area within the field. As yet another example, the report 432 may include multiple conclusions, one for each of a set of pairs of areas within the field.

As yet another example, areas may be grouped into larger areas, and the report 432 may contain a separate conclusion for each such larger area. Such grouping may be performed in any way. For example, all areas having the same soil type may be grouped together into a single area representing that soil type, and the report 432 may include a single conclusion for all areas of that soil type. One context in which such a report is useful is that in which the same product, rate, or system is applied across an entire field, and in which it is desirable to know the relative impact of that product, rate, or system on different soil types or other human-defined or naturally occurring zones or groupings within the field.

Furthermore, the report 432 may include multiple conclusions for a single area. For example, the report 432 may include a measurement of the impact on yield of a particular product on a particular area, and a prediction of the impact on yield of a different product on the same area.

Yield impact may be represented within the report 432 in any of a variety of ways, such as in terms of bushels per acre, reduced expense associated with a particular yield, or increased profit associated with a particular yield. Reduced expense may be calculated based on, for example, the known cost of the deliberate intervention(s) being measured. Increased profit may be calculated based on, for example, the known cost of the deliberate intervention(s) being measured and the known revenue associated with each unit (e.g., bushel) of crop yield.

The report 432 may take any form. For example, it may take the form of a text document or spreadsheet which is readable by a human and which is provided as output by a display monitor, printer, or other output device. As another example, the report 432 may take the form of a spreadsheet or database from which structured data may be extracted and processed automatically by a computer. In the former case, the report 432 may include, for example, the table of results, one or more maps of the field, one or more graphs illustrating variations in the data, and a statement of the costs and benefits of the product to the farmer.

Embodiments of the present invention have various advantages, such as the following. Embodiments of the present invention may be used to automatically produce measurement of the impact on crop yield within an area of any number of variables representing natural conditions and deliberate interventions within that area. Multiple such measurements may be automatically and simultaneously produced for multiple areas. All such measurements may be produced without requiring any human intervention, discretion, or judgment. As a result, such measurements may be produced more accurately, quickly, and inexpensively than ever before.

In particular, the ability to eliminate the need for human intervention to perform such spatial analysis means that automated spatial analysis may now be performed at a small fraction of the cost than traditionally is incurred when a human expert is hired to perform spatial analysis manually. The high cost of traditional, manual, spatial analysis has often discouraged farmers from performing such analysis. Because the fully automated techniques disclosed herein significantly reduce the cost of spatial analysis, such techniques hold the promise of enabling more farmers than ever before to use, and realize the benefits of, spatial analysis.

Furthermore, low-cost automated spatial analysis may be useful to other businesses which support farmers. For example, businesses which sell fertilizers, pesticides, and other agricultural inputs may leverage the automated, low-cost spatial analysis techniques disclosed herein by offering spatial analysis to farmers of their fields at low or no cost, for the purpose of demonstrating the site-specific impact of their inputs on crop yield. For an example of a business model in which farmers are only charged for inputs if such inputs demonstrably lead to increased yield, see the above-referenced patent applications entitled, "Method of Marketing and Contracting for the Sale of Agricultural Yield-Increase Related Products." The techniques disclosed herein may be used in connection with such a business model to minimize the added cost to the input supplier of demonstrating the effectiveness of its products.

Another advantage of embodiments of the present invention is that they may be used to promote enhanced environmental stewardship. By enabling appropriate rates of inputs (no more and no less than is necessary to optimize yield) to be applied to crop fields, runoff may be minimized, thereby reducing a source of significant environmental degradation. Traditionally, farmers have lacked techniques for calculating, easily and inexpensively, the precise amounts of inputs to apply to their fields. Therefore, in an excess of caution, farmers tend to over-apply such inputs rather than risk suboptimal crop yields as a result of unintentional under-application of inputs. Embodiments of the present invention, in contrast, enable the proper input rates to be calculated both quickly and inexpensively, thereby enabling farmers to apply correct input rates with precision. When fertilizers are over-applied, they tend to run off the field, often contaminating local watersheds. Fertilizer runoff has been linked to the creation of more than 150 hypoxic dead zones in water bodies worldwide. Embodiments of the present invention may be used to significantly reduce or eliminate such runoff by eliminating the need to over-apply fertilizers in an attempt to optimize crop yield.

It is to be understood that although the invention has been described above in terms of particular embodiments, the foregoing embodiments are provided as illustrative only, and do not limit or define the scope of the invention. Various other embodiments, including but not limited to the following, are also within the scope of the claims. For example, elements and components described herein may be further divided into additional components or joined together to form fewer components for performing the same functions.

Data elements described herein, such as the spatial yield data 204, experimental design data 212, treatment status data 220, field boundary data 206, buffer region data 222, and other data disclosed herein, may be represented in any form and tangibly stored in any kind of computer-readable medium. Acts of retrieving and otherwise reading data may be performing over any kind of communications channel, such as a bus within a computer, or a wired or wireless network connection between two or more computers. Data may be reformatted before, during, or after transmission to perform the functions disclosed herein.

The techniques described above may be implemented, for example, in hardware, software tangibly stored in a computer-readable medium, firmware, or any combination thereof. The techniques described above may be implemented in one or more computer programs executing on a programmable computer including a processor, a storage medium readable by the processor (including, for example, volatile and non-volatile memory and/or storage elements), at least one input device, and at least one output device. Program code may be applied to input entered using the input device to perform the functions described and to generate output. The output may be provided to one or more output devices.

Each computer program within the scope of the claims below may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage device for execution by a computer processor. Method steps of the invention may be performed by a computer processor executing a program tangibly embodied on a computer-readable medium to perform functions of the invention by operating on input and generating output. Suitable processors include, by way of example, both general and special purpose microprocessors. Generally, the processor receives instructions and data from a read-only memory and/or a random access memory. Storage devices suitable for tangibly embodying computer program instructions include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive programs and data from a storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

What is claimed is:

1. A computer-implemented method comprising:
   (A) identifying spatial yield data descriptive of crop yields associated with a plurality of spatial locations in a field;
   (B) identifying at least one of the following data:
      (1) experimental design data descriptive of at least one product, system, or rate associated with the plurality of locations in the field;
      (2) noise data descriptive of noise variables associated with the plurality of locations in the field; and
   (C) deriving, from the data identified in (B), a measure of the crop yield response in the field to the data identified in (B);
   wherein the measure of the impact on crop yield comprises a measure of:
   the impact of the data identified in (B) on crop yield in a first area of the field relative to
   the impact of the data identified in (B) on crop yield in a second area of the field.

2. The method of claim 1, wherein at least one product, system, or rate comprises at least one product, system, or rate previously applied to the plurality of locations in the field.

3. The method of claim 1, wherein at least one product, system, or rate comprises at least one product, system, or rate planned to be applied to the plurality of locations in the field.

4. The method of claim 1, wherein the measure of the impact on crop yield derived in (C) comprises a measure of past impact on crop yield of the data identified in (B).

5. The method of claim 1, wherein the measure of the impact on crop yield derived in (C) comprises a prediction of future impact on crop yield of the data identified in (B).

6. The method of claim 1, wherein the measure of the impact on crop yield comprises a measure of the impact of the data identified in (B) on crop yield in a particular area in the field.

7. The method of claim 1, wherein the measure of the impact on crop yield comprises a measure of:
   the impact of a first subset of the data identified in (B) on crop yield in the field relative to
   the impact of a second subset of the data identified in (B) on crop yield in the field.

8. The method of claim 1, further comprising:
   (D) before (C), identifying a buffer region within the field; and
   wherein (C) comprises deriving a measure of the impact on crop yield only within regions of the field other than the buffer region.

9. The method of claim 1, wherein (A) comprises retrieving the spatial yield data in electronic form from yield monitoring equipment.

10. The method of claim 1, wherein (B) further comprises retrieving natural condition data in electronic form over an electronic communications network, wherein the natural condition data is descriptive of natural conditions of the plurality of locations in the field.

11. The method of claim 1, further comprising:
    (D) before (C), correcting erroneous data within the data identified in (B) to produce corrected data; and
    wherein (C) comprises deriving a measure of the impact on crop yield based on the corrected data.

12. The method of claim 1, further comprising:
    (D) before (C), spatially sorting the data identified in (B) to produce sorted data; and
    wherein (C) comprises deriving a measure of the impact on crop yield based on the sorted data.

13. The method of claim 12, further comprising:
    (E) before (C), developing a rectangular data table based on the sorted data; and
    wherein (C) comprises deriving a measure of the impact on crop yield based on the rectangular data table.

14. The method of claim 1, wherein (B) comprises identifying the experimental design data and at least one of natural condition data and the noise data, wherein the natural condition data is descriptive of natural conditions of the plurality of locations in the field.

15. The method of claim 1, wherein (B) comprises identifying natural condition data and at least one of the experimental design data and the noise data, wherein the natural condition data is descriptive of natural conditions of the plurality of locations in the field.

16. A computer-implemented method comprising:
    (A) identifying spatial yield data descriptive of crop yields associated with a plurality of spatial locations in a field;
    (B) identifying at least one of the following data:
       (1) experimental design data descriptive of at least one product, system, or rate associated with the plurality of locations in the field;
       (2) noise data descriptive of noise variables associated with the plurality of locations in the field;

(C) deriving, from the data identified in (B), a measure of the crop yield response in the field to the data identified in (B); and (D) before (C), identifying a boundary of the field; and wherein (C) comprises deriving a measure of the impact on crop yield only within the boundary of the field.

17. The method of claim 16, wherein (D) comprises retrieving raw boundary data in electronic form and identifying the boundary based on the raw boundary data.

18. The method of claim 16, wherein (D) comprises identifying the boundary by applying an automated boundary detection process to a digital image of the field.

19. A computer-implemented method comprising:

(A) identifying spatial yield data descriptive of crop yields associated with a plurality of spatial locations in a field;

(B) identifying at least one of the following data:
 (1) experimental design data descriptive of at least one product, system, or rate associated with the plurality of locations in the field;
 (2) noise data descriptive of noise variables associated with the plurality of locations in the field; and (C) deriving, from the data identified in (B), a measure of the crop yield response in the field to the data identified in (B);

wherein (C) comprises:
 (C)(1) generating a spatial interaction structure based on the data identified in (B);
 (C)(2) generating a spatial model based on the spatial interaction structure; and
 (C)(3) deriving the measure of the impact on crop yield based on the spatial model.

20. The method of claim 19, wherein the spatial model comprises a spatial error process model.

21. A computer-readable medium tangibly storing computer program instructions executable by a computer processor to perform a method comprising:

(A) identifying spatial yield data descriptive of crop yields associated with a plurality of spatial locations in a field;

(B) identifying at least one of the following data:
 (1) experimental design data descriptive of at least one product, system, or rate associated with the plurality of locations in the field;
 (2) noise data descriptive of noise variables associated with the plurality of locations in the field; and (C) deriving, from the data identified in (B), a measure of the crop yield response in the field to the data identified in (B);

wherein the measure of the impact on crop yield comprises a measure of:
 the impact of the data identified in (B) on crop yield in a first area of the field relative to
 the impact of the data identified in (B) on crop yield in a second area of the field.

22. The computer-readable medium of claim 21, wherein at least one product, system, or rate comprises at least one product, system, or rate previously applied to the plurality of locations in the field.

23. The computer-readable medium of claim 21, wherein at least one product, system, or rate comprises at least one product, system, or rate planned to be applied to the plurality of locations in the field.

24. The computer-readable medium of claim 21, wherein the measure of the impact on crop yield derived in (C) comprises a measure of past impact on crop yield of the data identified in (B).

25. The computer-readable medium of claim 21, wherein the measure of the impact on crop yield derived in (C) comprises a prediction of future impact on crop yield of the data identified in (B).

26. The computer-readable medium of claim 21, wherein the measure of the impact on crop yield comprises a measure of the impact of the data identified in (B) on crop yield in a particular area in the field.

27. The computer-readable medium of claim 21, wherein the measure of the impact on crop yield comprises a measure of:
 the impact of a first subset of the data identified in (B) on crop yield in the field relative to
 the impact of a second subset of the data identified in (B) on crop yield in the field.

28. The computer-readable medium of claim 21, further comprising:
 (D) before (C), identifying a buffer region within the field; and
 wherein (C) comprises deriving a measure of the impact on crop yield only within regions of the field other than the buffer region.

29. The computer-readable medium of claim 21, wherein (A) comprises retrieving the spatial yield data in electronic form from yield monitoring equipment.

30. The computer-readable medium of claim 21, wherein (B) further comprises retrieving natural condition data in electronic form over an electronic communications network, wherein the natural condition data is descriptive of natural conditions of the plurality of locations in the field.

31. The computer-readable medium of claim 21, further comprising:
 (D) before (C), correcting erroneous data within the data identified in (B) to produce corrected data; and
 wherein (C) comprises deriving a measure of the impact on crop yield based on the corrected data.

32. The computer-readable medium of claim 21, further comprising:
 (D) before (C), spatially sorting the data identified in (B) to produce sorted data; and
 wherein (C) comprises deriving a measure of the impact on crop yield based on the sorted data.

33. The computer-readable medium of claim 32, further comprising:
 (E) before (C), developing a rectangular data table based on the sorted data; and
 wherein (C) comprises deriving a measure of the impact on crop yield based on the rectangular data table.

34. The computer-readable medium of claim 21, wherein (B) comprises identifying the experimental design data and at least one of natural condition data and the noise data, wherein the natural condition data is descriptive of natural conditions of the plurality of locations in the field.

35. The computer-readable medium of claim 21, wherein (B) comprises identifying natural condition data and at least one of the experimental design data and the noise data, wherein the natural condition data is descriptive of natural conditions of the plurality of locations in the field.

36. A computer-readable medium tangibly storing computer program instructions executable by a computer processor to perform a method comprising:

(A) identifying spatial yield data descriptive of crop yields associated with a plurality of spatial locations in a field;

(B) identifying at least one of the following data:
 (1) experimental design data descriptive of at least one product, system, or rate associated with the plurality of locations in the field;

(2) noise data descriptive of noise variables associated with the plurality of locations in the field;
(C) deriving, from the data identified in (B), a measure of the crop yield response in the field to the data identified in (B); and
(D) before (C), identifying a boundary of the field; and
wherein (C) comprises deriving a measure of the impact on crop yield only within the boundary of the field.

37. The computer-readable medium of claim 36, wherein (D) comprises retrieving raw boundary data in electronic form and identifying the boundary based on the raw boundary data.

38. The computer-readable medium of claim 36, wherein (D) comprises identifying the boundary by applying an automated boundary detection process to a digital image of the field.

39. A computer-readable medium tangibly storing computer program instructions executable by a computer processor to perform a method comprising:
(A) identifying spatial yield data descriptive of crop yields associated with a plurality of spatial locations in a field;
(B) identifying at least one of the following data:
(1) experimental design data descriptive of at least one product, system, or rate associated with the plurality of locations in the field;
(2) noise data descriptive of noise variables associated with the plurality of locations in the field;
(C) deriving, from the data identified in (B), a measure of the crop yield response in the field to the data identified in (B); and
wherein (C) comprises
(C)(1) generating a spatial interaction structure based on the data identified in (B);
(C)(2) generating a spatial model based on the spatial interaction structure; and
C)(3) deriving the measure of the impact on crop yield based on the spatial model.

40. The computer-readable medium of claim 39, wherein the spatial model comprises a spatial error process model.

\* \* \* \* \*

UNITED STATES PATENT AND TRADEMARK OFFICE
CERTIFICATE OF CORRECTION

| | |
|---|---|
| PATENT NO. | : 8,306,750 B2 |
| APPLICATION NO. | : 12/719154 |
| DATED | : November 6, 2012 |
| INVENTOR(S) | : Terry Griffin et al. |

It is certified that error appears in the above-identified patent and that said Letters Patent is hereby corrected as shown below:

On page 2, under "OTHER PUBLICATIONS", in column 1, line 8, Delete "Yeikd" and insert -- Yield --, therefor.

In column 16, line 15, In Claim 39, Delete "C)(3)" and insert -- (C)(3) --, therefor.

Signed and Sealed this
Twelfth Day of March, 2013

Teresa Stanek Rea
*Acting Director of the United States Patent and Trademark Office*